(12) United States Patent
Cosenza

(10) Patent No.: US 6,220,415 B1
(45) Date of Patent: Apr. 24, 2001

(54) HOLD DOWN FASTENER

(75) Inventor: Frank J. Cosenza, Santa Barbara, CA (US)

(73) Assignee: The Fairchild Corporation, Dulles, VA (US)

( * ) Notice: Subject to any disclaimer, the term of this patent is extended or adjusted under 35 U.S.C. 154(b) by 0 days.

(21) Appl. No.: 09/393,071

(22) Filed: Sep. 7, 1999

(51) Int. Cl.$^7$ .................................................. F16D 43/20
(52) U.S. Cl. ................................................ 192/56.1; 464/37
(58) Field of Search ............................. 192/56.1; 464/37

(56) References Cited

U.S. PATENT DOCUMENTS

| | | | |
|---|---|---|---|
| 1,865,559 | * 7/1932 | De Montgrand | 464/37 X |
| 4,180,990 | * 1/1980 | Hill | 464/37 |
| 4,534,234 | * 8/1985 | Cosenza | 74/89.15 |
| 4,702,122 | * 10/1987 | Richard | 464/37 X |
| 4,766,641 | * 8/1988 | Daglow | 464/37 X |
| 4,878,880 | * 11/1989 | Williams | 464/37 |
| 5,183,140 | * 2/1993 | Nicoll | 192/56.1 |
| 5,601,491 | * 2/1997 | Chan et al. | 464/37 |
| 6,019,708 | * 2/2000 | Kaminski et al. | 464/37 X |

* cited by examiner

*Primary Examiner*—Rodney H. Bonck
(74) *Attorney, Agent, or Firm*—Irving Keschner

(57) ABSTRACT

A hold down fastener clutching mechanism comprising an inner torque ring having a pair of split outer ring members with angled ends. A sloped surface at one of the angled ends is at a predetermined angle to the fastener axis. The other end of the inner ring member is integrally joined to an adjacent inner ring member which has a pair of rib members. The selected slope (angle) of the angled surface, for the specific material used, determines the amount of prevailing torque provided by the device itself. A pair of angled rib members protrude from the sleeve inner diameter, the angle of the rib members corresponding to the angled surface formed on the inner torque ring. The inner torque ring and the sleeve are operatively connected such that when the connecting shaft is rotated, the rib members on the inner surface of the sleeve compresses the inner torque ring to the desired preload. In one embodiment, the inner ring is a single, integral member. In a second embodiment, the inner torque ring comprises a plurality of substantially identical torque rings.

8 Claims, 5 Drawing Sheets

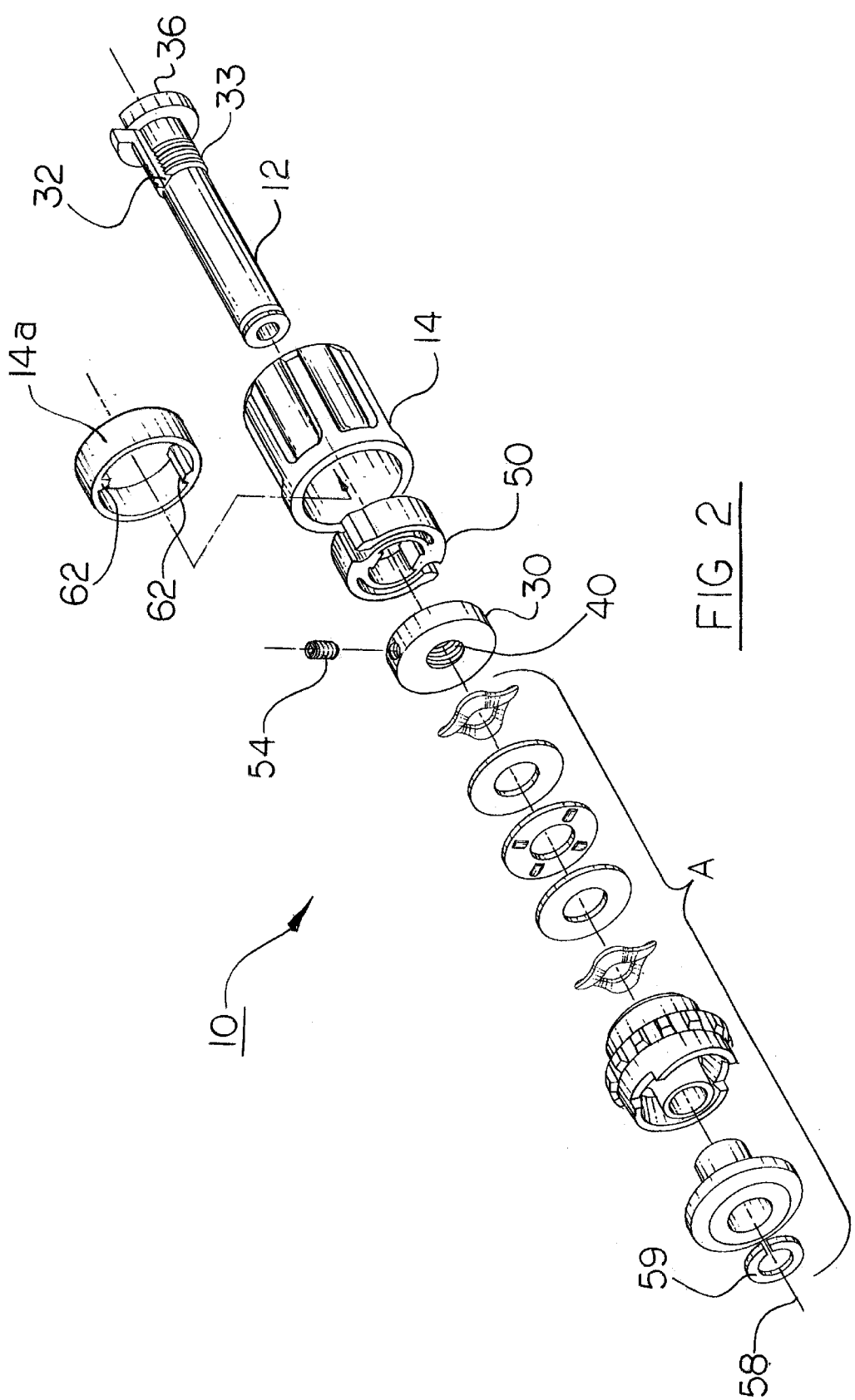

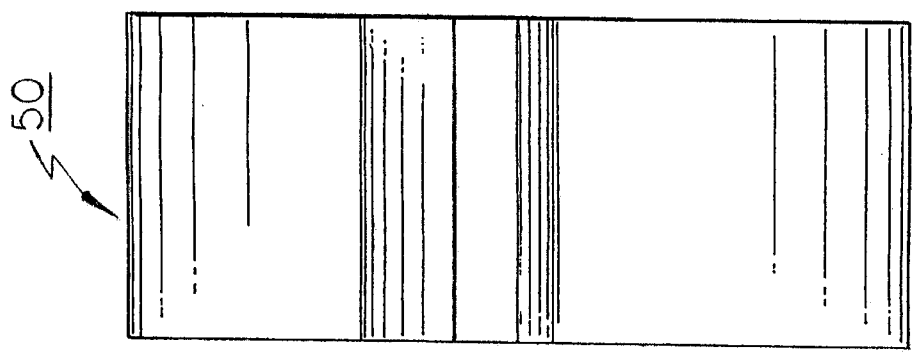
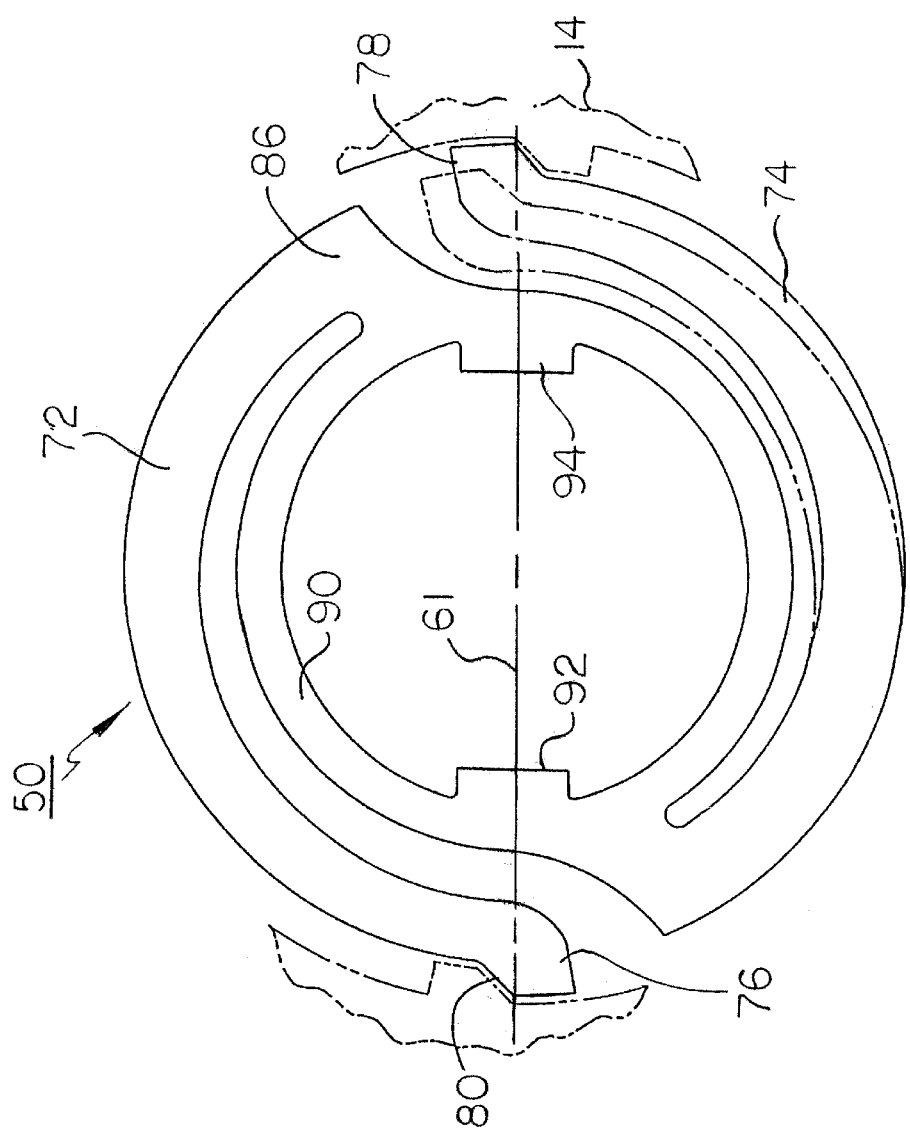

HOLD DOWN FASTENER

BACKGROUND OF INVENTION

1. Field of the Invention

The present invention provides a hold-down type fastener wherein the preload is set without extensive adjustments, and independent of the fastener axial load and wherein the number of fastener components are substantially reduced.

2. Description of the Prior Art

U.S. Pat. No. 4,534,234 discloses a hold-down type fastener for the insertion and extraction of modular units positioned on an airframe shelf. The fastener disclosed in this patent, although providing satisfactory results, uses a substantial number of components adding to the fastener weight. In addition, assembly time is increased with the attendant increase in labor costs. The fastener utilizes a clutching mechanism that requires numerous adjustments during assembly fabrication. In particular, all the components are first assembled together and then positioned on a fixture. By trial and error, the preload is adjusted on a machine recording the preload. Should further adjustment be required, due to unacceptable preload levels, the fastener is then disassembled with everything forward of the adjustable plate component 66 being removed. The adjustable plate 66 is then rotated clockwise or counterclockwise to the desired preload. The fastener is then reassembled, the preload measured and if the selected value is reached, set screws are locked. It should be noted that '234 fastener takes into account the entire axial component assembly in setting the preload which in turn causes the complicated preload setting procedure. Once assembled and used to secure the modular unit, the operator rotates the fastener sleeve clockwise. As the hold-down progresses towards its defined clutching load, the rotational resistance of the sleeve increases steadily until it finally "clutches out." At that point the hold-down provides a fixed, non-adjustable prescribed load against the modular unit. In this case, the tightening torque increases as the hold down approaches the maximum clutch loading.

SUMMARY OF THE PRESENT INVENTION

The present invention provides an improved hold-down fastener with less parts, less weight, and a simplified preload prevailing torque adjustment technique. In particular, the two Belleville washers, three spacer washers and the two clutching plates positioned behind the adjuster plate used in the prior design are replaced with the simplified preload clutching mechanism of the present invention. The new clutching mechanism comprises an inner torque ring having a pair of split outer ring members with angled ends. A sloped surface at one of the angled ends is at a predetermined angle to the fastener longitudinal axis. The other end of the inner ring member may be integrally or separately joined to an adjacent sleeve/ring member which has two or more protruding rib members. The selected slope (angle) and the internal diameter of the angled surface for the specific material used, determines the amount of prevailing torque provided by the device itself.

The sleeve disclosed in the above-mentioned patent is modified by fabricating two or more rib members having an angled surface, on the interior sleeve surface, the rib angle corresponding to the angled surface formed on inner torque ring. An optional design is to incorporate a separate ring that is subsequently captivated to the internal portion of the sleeve. The inner torque ring and the inner sleeve surface are operatively connected such that when the connecting shaft is rotated, the rib members on the inner surface of the sleeve compresses the split ring members to the desired preload. In one embodiment, the inner torque ring is a single, integral member. In a second embodiment, the inner torque ring comprises a plurality of substantially identical torque rings.

The present invention thus provides an improved hold down fastener wherein the number of fastener components are reduced, which in turn reduces the overall weight of the fastener. The fastener preload is easily adjusted without requiring the extensive adjustment process currently required, reducing the fastener production costs and increasing reliability.

BRIEF DESCRIPTION OF THE DRAWING

For a better understanding of the invention, as well as other objects and further features thereof, reference is made to the following description which is to be read in conjunction with the accompanying drawing wherein:

FIG. 2 is an exploded view illustrating the components forming the fastener shown in FIG. 1;

FIG. 5A is a plan view of the fasteners inner torque ring component and FIG. 5B is a side view thereof.

DESCRIPTION OF THE PRESENT INVENTION

Figure 1:
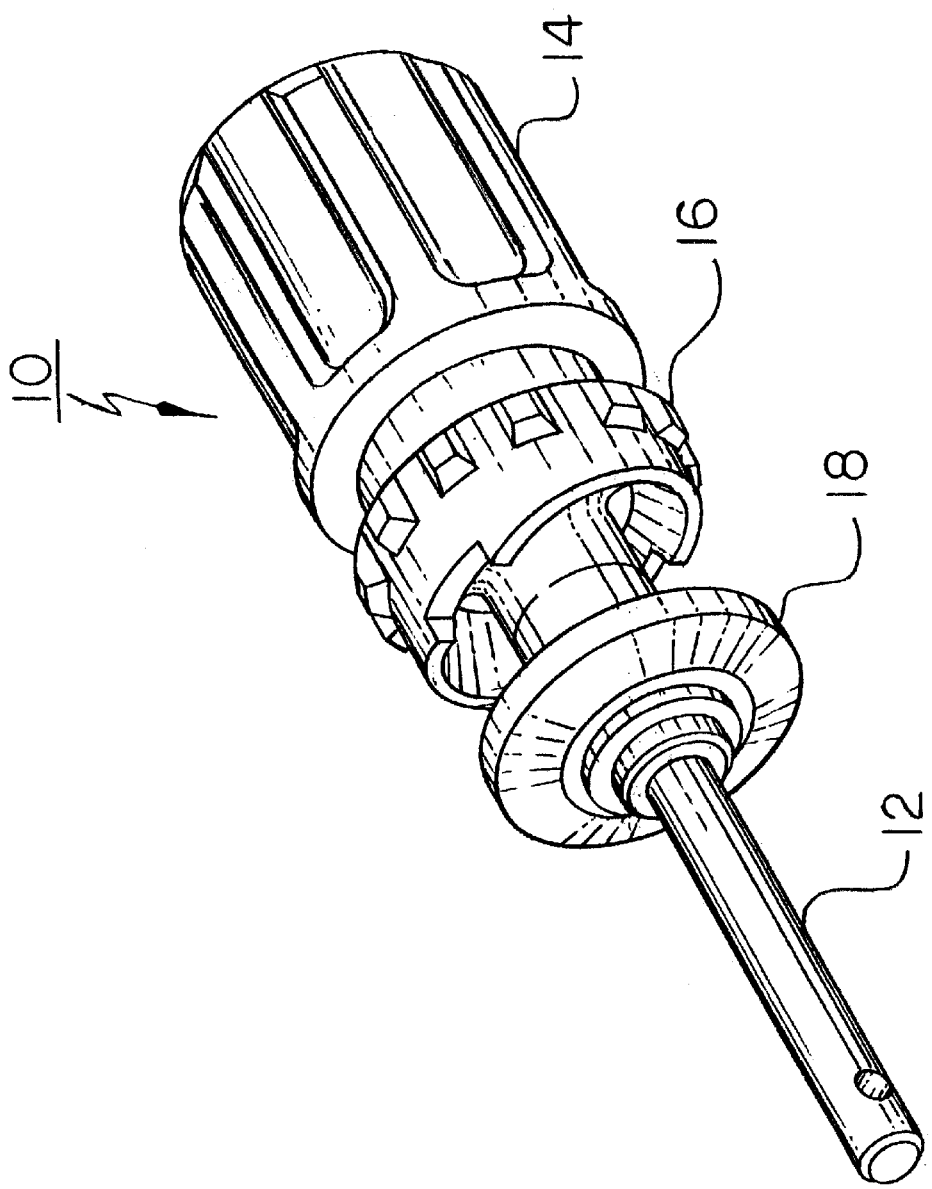
FIG. 1 is a perspective view of the hold-down fastener of the present invention.

Referring now to FIG. 1, fastener 10 of the present invention is illustrated. FIG. 2 comprises shaft 12 about which is mounted rotatable sleeve 14, freely rotating keeper 16, and extractor 18. Fastener 10, as will be described hereinafter, is basically identical to the fastener shown in U.S. Pat. No. 4,534,234 with respect to its external appearance and the basic function of placing a prevailing torque on a modular unit. The only substantial change, and the subject of the present invention, is in the clutching structure and the reduction of some internal components within sleeve 14 as will be described hereinafter. Thus, the description that follows, for the sake of brevity, will discuss the mechanism for setting the prevailing load for the modular unit being controlled.

FIG. 2 is an exploded view of fastener 10 components. Since the components within the portion A to the left of plate member 30 are essentially identical to the components shown in the aforementioned '234 patent, a discussion thereof will not be set forth. The components to the right of plate 30 comprise the shaft 12 having threaded portion 33 thereon and slots 32 and 34 (only slot 32 is shown in FIG. 2). Shaft 12 also comprises slotted head 36. Thread 33, when the fastener is assembled, is internally threaded to plate 30, plate 30 having an internal thread 40 formed therein. An inner torque ring 50, the details of which will be described hereinafter, is positioned for insertion within sleeve 14 as illustrated.

A set screw 54 is provided to secure plate 30 within sleeve 14 when the components are to be assembled. Although not visible in FIG. 2, a member that controls the shape and size of member 50 and thus the prevailing torque is cast as part of the internal diameter of sleeve 14. The longitudinal axis of fastener 10 is illustrated by reference numeral 58. FIG. 2 illustrates an optional configuration for the internal surface of ring member 14; in particular, separate ring member 14a is provided which can be subsequently captivated to the internal portion of sleeve 14.

Figure 4:
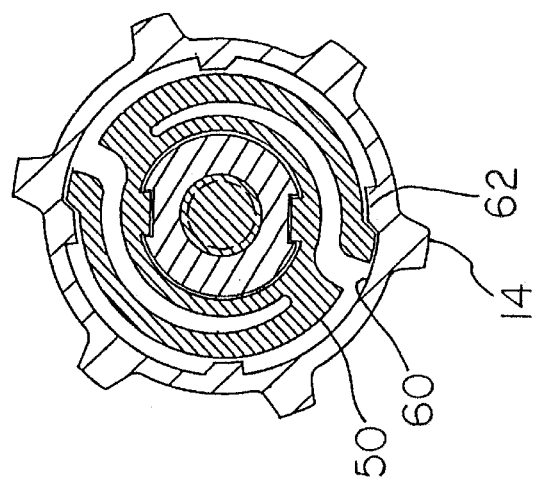
FIG. 4 is a cross-sectional view along line 3—3 of FIG. 3.
Figure 3:
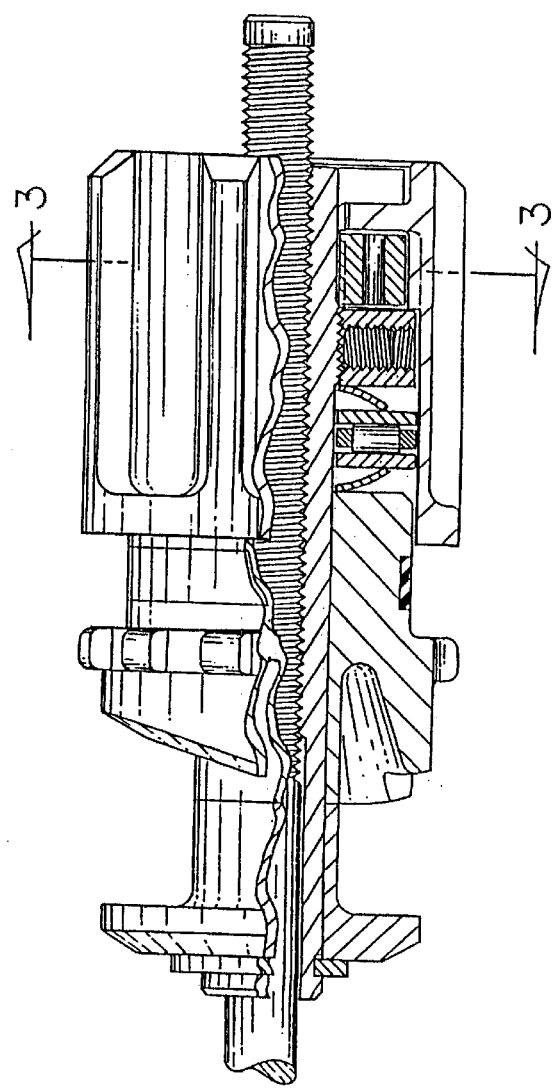
FIG. 3 is a side sectional view of the fastener shown in FIG. 1.

FIGS. 3 and 4 illustrate in detail the novel features of the present invention. In particular, the inner surface 60 of sleeve 14 has a plurality of sawtooth shaped protrusions, or lugs, 62 formed thereon. Inner torque ring member 50 is positioned within sleeve 14 in operative relationship to protrusions 62 as illustrated. FIGS. 5A and 5B show in more detail inner ring member 50. Inner ring member 50 comprises a pair of split outer ring members 72 and 74 having radiused ends 76 and 78, respectively. Sloped surface 80 at angled end 76 is at a predetermined angle to horizontal axis 61 illustrated (the configuration and function of split ring member 72 is identical to that of split ring member 74 and the discussion hereinafter thus will be directed to split ring 72). The other end 86 of ring member 72 is integrally joined to inner ring member 90, member 90 having a pair of integral protrusions 92 and 94. The selected slope (angle) of surface 80, and the internal diameter of protrusions, or lugs, 62 of sleeve 14, (or the internal diameter of ring 14a) and the specific material used, determines the amount of breakaway torque provided by the fastener itself.

As illustrated, rib protrusions 92 and 94 are, when the fastener is assembled, positioned within the slots 32 and 34, respectively, formed in shaft 12. Referring again to FIGS. 5A and 5B, rotation of sleeve 14 in the clockwise direction causes beam 72 of inner torque ring 50 to be compressed to the position shown in phantom. The amount of compression, determined by the angle of sloped surface 80 and the internal diameter of protrusions, or lugs, 62 of sleeve 14 (or the internal diameter of ring 14a) and the material used to fabricate member 50, determines the fastener breakaway torque.

Figure 6B:
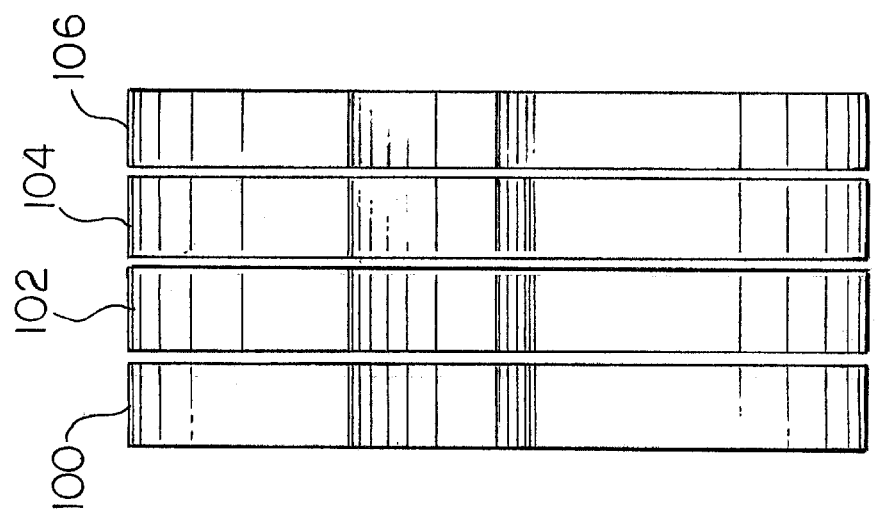
FIG. 6A is a plan view of an alternative version of the fastener inner torque ring and FIG. 6B is a side view thereof.
Figure 6A:
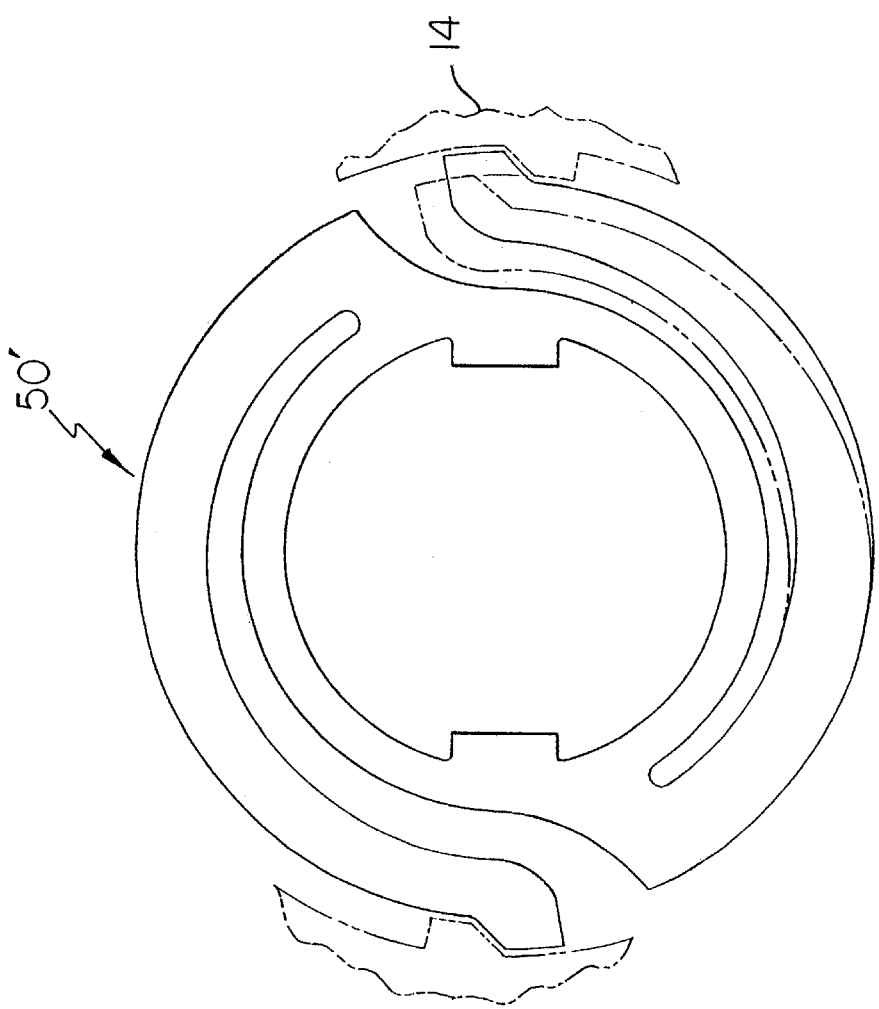

Referring to FIG. 6A, another embodiment of inner torque ring 50 is illustrated. In essence, single inner torque ring 50 is replaced by a series of four inner rings 100, 102, 104 and 106, each ring having a configuration identical to ring 50 and operative with the protrusions extending from the inner surface of sleeve 14 in the manner described hereinabove.

It should be noted that more or less than four thinner rings can be used.

The advantage of using the series of rings as follows. Assuming, for example, that ring 50 has a particular thickness, i.e., 0.240 inches and having a predetermined preload of 120 in.-lbs. Assuming ring 50 is replaced with the rings, shown in FIGS. 6A and 6B, each 0.060 inches thick, removing one ring from the configuration will provide the fastener with 90 in.-lbs. of preload. In essence, the breakaway torque is easily and simply adjusted to customer requirements.

The device is assembled as follows:

Shaft 12 is inserted through an opening formed in sleeve 14. The inner torque ring 50 is then inserted within sleeve 14 such that rib members 92 and 94 on ring 50 align with slots 32 and 34, respectively, formed on shaft 12, ring 50 and sleeve 14 being secured to rotate together when shaft 12 is rotated.

Circular plate 30 is then threaded on shaft 12 to secure ring 50 in place and reduce the possibility that the components will wobble within sleeve 14, the inner thread thereon being secured to the threaded portion 33 of shaft 12 by set screw 54. The remaining components of the hold down device shown in the '234 patent are then mounted to shaft 12 (except the three steel washers, two Belleville washers, clutch and clutch locking plate) and secured thereto by retaining ring 59 (FIG. 2). The shaft 12 is then rotated, the connector hook/remover hook pushing the module unit in, until the inner torque ring 50 clutches out (further rotation does not put on further pressure on the inner torque ring 50). As noted hereinabove, the angled surfaces and diameters on the inner ring controls the amount of preload. When sleeve 14 is rotated, the protrusions on the inner surface of sleeve 14 compresses inner torque ring 50; clutch out occurs at the selected preload as the inner sleeve protrusions snap over the angled surface of edges 80 while maintaining preload on the module unit. It should be noted that the present invention sets the preload independently of the components up front therefrom in contradistinction to the design shown in the '234 patent wherein preload is based on all the components of the hold down fastener.

As set forth hereinabove, in lieu of having protrusions 62 formed on the inner surface 60 of sleeve 14, a separate outer torque ring 14a having the same protrusions 62 and operatively coupled to the inner surface 60 of sleeve 14 can also be utilized to interact with inner torque ring 50.

The present invention thus provides an improved clutch mechanism for use in a hold down fastener wherein preload is easily established and wherein the number of fastener components are reduced, thus reducing the weight of the fastener and also reducing manufacturing labor costs.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A clutching mechanism for use in a hold down type fastener comprising:

a rotatable shaft member having an outer surface;

a sleeve member having an interior surface, said shaft member being coaxially aligned with said sleeve member, a plurality of protrusions extending from said interior surface; and a torque ring having an outer surface with shaped end members formed thereon to engage the protrusions extending from the interior surface of said sleeve member, said torque ring having an inner surface with protrusions extending outwardly therefrom;

said inner surface protrusions adapted to engage slots formed on the outer surface of said shaft member whereby rotation of said sleeve causing said torque ring to be compressed.

2. The clutching mechanism of claim 1 wherein the thickness of said torque ring effects the prevailing torque applied to a modular unit coupled to said shaft member.

3. The clutching mechanism of claim 2 wherein the torque ring material effects the prevailing torque applied to a modular unit coupled to said shaft member.

4. The clutching mechanism of claim 1 wherein said torque ring comprises a plurality of ring members having an inner surface, each ring member having protrusions that extend from said inner surfaces and engage the protrusions extending from the inner surface of said sleeve member.

5. The clutching mechanism of claim 4 wherein each ring member is separately coupled to said slots formed on said shaft.

6. The clutching mechanism of claim wherein said torque ring has a horizontal axis and comprises inner and outer ring portions, said inner and outer portions being spaced apart at predetermined locations.

7. The clutching mechanism of claim 6 wherein the ends of said outer ring member are angled with respect to said horizontal axis.

8. The clutching mechanism of claim 7 wherein the angle of said outer ring member ends determine the breakaway torque of the clutching mechanism.

* * * * *